Sept. 24, 1957
E. B. ETCHELLS
2,807,253
POPPET VALVE GUIDE
Filed June 15, 1955
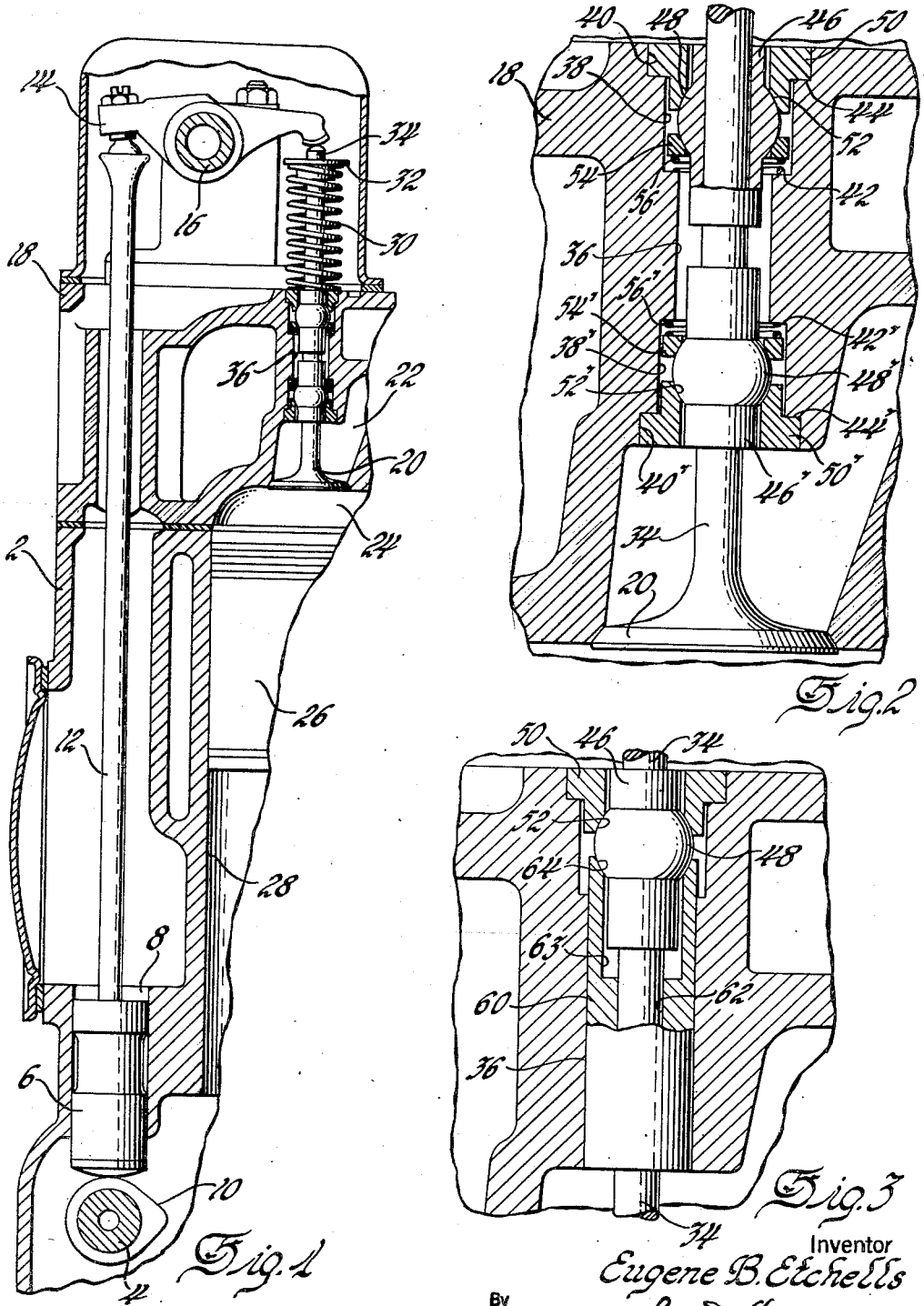
Inventor
Eugene B. Etchells
By
S. C. Thorpe
Attorney ary Sept. 24, 1957

2,807,253
POPPET VALVE GUIDE

Eugene B. Etchells, Birmingham, Mich., assignor to General Motors Corporation, Detroit, Mich., a corporation of Delaware Application June 15, 1955, Serial No. 515,720

10 Claims. (Cl. 123—188)

This invention relates to valve operating mechanisms for internal combustion engines and the like, and particularly to guiding of the poppet valve stem in the cylinder head or other fixed part of the engine.

The object of the invention is to provide an improved guiding means which will accommodate a certain amount of angular misalignment of the stem during reciprocation and thereby avoid valve sticking with consequent localized wear and objectionable noisy operation. This improvement is accomplished by providing separate sleeves to guide axially spaced sections of the stem, with at least one of the sleeves having freedom to pivot in one or more directions laterally of the axis of the other sleeve.

A better understanding of the means for accomplishing the invention will be had from the following description of two different embodiments, having reference to the attached drawing.

In the drawing: Figure 1 shows a transverse sectional view through a portion of an internal combustion engine having a poppet valve whose stem is guided in accordance with one embodiment of the invention.

Figure 2 is an enlarged fragmentary view similar to Figure 1, showing the improved valve guide means.

Figure 3 is a view similar to Figure 2, but showing a modified form of the invention.

In Figure 1 the engine includes a cylinder block and crankcase 2 with a camshaft 4 journaled for rotation. A valve lifter 6 is slidably reciprocal in a bore 8 and has its lower end in driven engagement with a cam 10 on the camshaft 4. Upward movement of the lifter 6 is transmitted by a push rod 12 to a rocker 14 journaled on a rocker shaft 16 supported on the engine cylinder head 18. The rocker 14, in turn, transmits the cam movement to a poppet valve 20 which reciprocates from its closed position shown to open a port 22 for communication with the combustion chamber 24 of the engine. Associated with the combustion chamber 24 is shown a piston 26 in its working cylinder 28. A return spring 30 operates in conventional manner by reacting against the cylinder head 18 and a washer 32 fixed to the valve stem 34 to bias the valve closed and maintain the lifter 6 on its cam 10.

As shown in greater detail in Figure 2, the cylinder head has an opening 36 through which the valve stem 34 extends. Opposite ends of the opening 36 are successively counterbored as at 38 and 40 and 38' and 40' to provide shoulders 42, 44 and 42', 44'. Slidably fitting the valve stem are upper and lower pivotal sleeves 46, 46' having their adjacent ends spaced apart as shown and formed intermediate their ends with external enlargements 48, 48' of spherical curvature. Embracing the respective outer ends of the sleeves 46, 46' are fixed sleeve members 50, 50' whose bores are large enough to accommodate substantial angular displacement or tilting of the sleeves 46, 46' from their positions shown. The fixed sleeves 50, 50' have their remotely associated ends flanged to effect a pressed fit in the counterbores 40, 40' and a firm seating on the shoulders 44, 44'. The adjacent ends of the fixed sleeves 50, 50' are provided with concave bearing surfaces 52, 52' to socketably journal the spherical enlargements 48, 48' of the pivotal sleeves. Facing these concave ends of the fixed sleeves are retaining rings 54, 54' with similarly concaved bearings surfaces which also journal the spherical enlargements in axially spaced relation from the fixed sleeves. These retaining rings have a loose sliding fit in the smaller counterbores 38, 38' and are biased into bearing engagement with the pivotal sleeve enlargements by coil compression springs 56, 56' seated on the innermost shoulders 42, 42'.

With the heretofore described construction it will be appreciated that as the poppet valve is reciprocated during engine operation, any tendency of its stem 34 to bend or tilt laterally of its axis as the result of side thrust imposed on it by either the valve rocker 14 or the valve return spring 30 will be accommodated by pivoting of the sleeves 48, 48' in their sockets 52 and 52' respectively. In so pivoting, the sleeves 48, 48' may better maintain alignment with the valve stem with the result that high localized bearing engagement by the valve stem periphery is prevented and the valve may thus reciprocate free of tendencies to stick and create objectionable operating noises.

In the embodiment shown in Figure 3, the valve stem opening 36 is not counterbored at its end nearest the combustion chamber but is press fitted with a fixed valve sleeve 60 having an extended bore 62 which slidably guides the valve stem below a single upper pivotal sleeve 46. The upper end of this fixed sleeve 60 is counterbored as at 63 to embrace the lower end of the pivotal sleeve 46 with sufficient clearance to accommodate substantial angular tilting of the latter. Adjacent the open end of this counterbore 63 the fixed sleeve is provided with a concave spherical socket portion 64 which cooperates with the spherical socket 52 of the upper fixed sleeve 50 in journaling the enlargement 48 for pivotal movement about its center. The operation is substantially the same as that of Figure 2 in that angular misalignment of the valve stem upper end relative to its lower end is accommodated by tilting of the pivotal sleeve 46. Although this construction does not provide the same extent of freedom for misalignment of the valve stem as does that of Figure 2, it involves less parts and serves satisfactorily in those engine installations where the amount of lateral thrust on the valve stem is not great enough to require the "full floating" arrangement of Figure 2.

While only two preferred embodiments of the invention have been disclosed, it is appreciated that numerous minor changes in the construction and arrangement of the parts may be made without departing from the spirit and scope of the invention as defined in the following claims.

I claim:

1. Guiding means for a reciprocating member, comprising a pivotal member having a guiding surface for said reciprocating member, and a fixed member for supporting said pivotal member, said pivotal and fixed members having coacting bearing surfaces defining the pivot axis of said pivotal member, said pivotal member having a sleeve portion defining an extension of its said guiding surface, said support having a surface embracing said sleeve portion with clearance to accommodate substantial pivotal movement of said pivotal member.

2. Guiding means for a reciprocating member comprising two separately pivotal members having respective guiding surfaces for axially spaced portions of said reciprocating member, and a fixed member, said fixed member and each of said pivotal members having coacting bearing surfaces defining the respective pivot axes of said pivotal members.

3. Guiding means for a reciprocating member comprising a pivotal member having a guiding surface for said reciprocating member, fixed means having a guiding surface for said reciprocating member axially spaced from said pivotal member guiding surface, said pivotal member and fixed means having coacting bearing surfaces defining the pivot axis of said pivotal member.

4. Guiding means for a reciprocating member, comprising a pivotal member having a guiding surface for said reciprocating member, supporting means for said pivotal member including two members having respective bearing surfaces in spaced opposing relation axially of the reciprocating member, said pivotal member having bearing surfaces coacting with said first named bearing surfaces in defining the pivot axis of said pivotal member, one of said members being fixed and the other being spring biased toward said fixed member.

5. Guiding means for a reciprocating member comprising two separately pivotal members having guiding surfaces for axially spaced portions of said reciprocating member, supporting means for said pivotal members including a fixed member and a movable member spring biased toward the fixed member for each of said pivotal members, said fixed and movable members having bearing surfaces in spaced opposing relation axially of the reciprocating member, each said pivotal member having bearing surfaces coacting with said bearing surfaces of its fixed and movable members in defining its pivot axis.

6. Stem guiding means for a poppet valve, comprising a sleeve having a bore of a diameter to slidably fit the valve stem, and a support embracing said sleeve with clearance radially of the sleeve to accommodate substantial angular displacement of the sleeve in maintaining its axial alignment with the valve stem, said support and sleeve having coacting bearing surfaces defining the axis of said angular displacement of the sleeve.

7. Stem guiding means for a poppet valve, comprising a sleeve having a bore of a diameter to slidably fit the valve stem, and a support embracing said sleeve with clearance radially of the sleeve to accommodate substantially angular displacement of the sleeve in maintaining its axial alignment with the valve setm, said sleeve having an external enlargement intermediate its ends providing a spherically curved bearing surface concentric with the sleeve axis, said support having a spherically curved bearing surface journaling said sleeve surface.

8. The invention defined in claim 7, with said support comprising two members in spaced apart relation axially of the sleeve, said spherically curved bearing surface of the support being in part on each of said members, and resilient means biasing said members toward each other to ensure their journaling engagement of said sleeve bearing surface.

9. Stem guiding means for a poppet valve, comprising a sleeve having a bore of a diameter to slidably fit the valve stem and an external enlargement intermediate its ends providing a spherically curved bearing surface concentric with the sleeve axis, a fixed support embracing said sleeve axially of said enlargement with clearance radially of the sleeve axis to accommodate substantial angular displacement of the sleeve in maintaining its axial alignment with the valve stem, a yieldable support axially spaced from said fixed support, and a spring biasing said yieldable support axially toward said fixed support, said fixed and yieldable supports having spherically concave bearing surfaces socketably journaling said enlargement bearing surface during angular displacements of the sleeve.

10. Stem guiding means for a poppet valve, comprising a pivotal sleeve having a bore of a diameter to slidably fit the valve stem and an external enlargement intermediate its ends providing a spherically curved bearing surface concentric with the sleeve axis, a fixed sleeve having a bore axially spsaced from one end of said pivotal sleeve and of a diameter to slidably fit the valve stem, said fixed sleeve having a counterbore embracing the pivotal sleeve with radial clearance to accommodate substantial angular displacement of the pivotal sleeve in maintaining its axial alignment with the valve stem, and a retaining ring axially spaced from said fixed sleeve, said retaining ring and the counterbored end of said fixed sleeve having spherically concave bearing surfaces socketably journaling said enlargement bearing surface during angular displacements of said pivotal sleeve.

References Cited in the file of this patent

UNITED STATES PATENTS

| 1,478,905 | Mycock | Dec. 25, 1923 |
| 2,706,665 | Brooks | Apr. 19, 1955 |

FOREIGN PATENTS

| 920,670 | France | Jan. 4, 1947 |
| 715,965 | Great Britain | Sept. 22, 1954 |